United States Patent
Qiu et al.

(10) Patent No.: US 12,239,213 B2
(45) Date of Patent: Mar. 4, 2025

(54) ORAL CAVITY TREATMENT DEVICE

(71) Applicant: Colgate-Palmolive Company, New York, NY (US)

(72) Inventors: Jianhong Qiu, Warren, NJ (US); Erin Speicher, Hoboken, NJ (US); Leighton Davies-Smith, Lebanon, NJ (US)

(73) Assignee: Colgate-Palmolive Company, New York, NY (US)

( * ) Notice: Subject to any disclaimer, the term of this patent is extended or adjusted under 35 U.S.C. 154(b) by 0 days.

(21) Appl. No.: 18/311,836

(22) Filed: May 3, 2023

(65) Prior Publication Data

US 2023/0371680 A1    Nov. 23, 2023

Related U.S. Application Data

(60) Provisional application No. 63/343,894, filed on May 19, 2022.

(51) Int. Cl.
*A61C 19/06*    (2006.01)
*A46B 11/00*    (2006.01)

(52) U.S. Cl.
CPC .......... *A46B 11/002* (2013.01); *A61C 19/063* (2013.01)

(58) Field of Classification Search
CPC ............................ A46B 11/002; A61C 19/063
USPC .................................................. 401/28, 179
See application file for complete search history.

(56) References Cited

U.S. PATENT DOCUMENTS

| | | | |
|---|---|---|---|
| 3,653,778 A | 4/1972 | Freiling | |
| 4,580,588 A | 4/1986 | Swope, Jr. | |
| 5,879,095 A | 3/1999 | Gueret | |
| 6,238,117 B1 | 5/2001 | Griebel et al. | |
| 6,244,777 B1 | 6/2001 | Reid | |
| 6,481,910 B1 | 11/2002 | Yang | |
| D495,803 S | 9/2004 | Gough et al. | |
| 7,309,184 B2 | 12/2007 | Butcher et al. | |

(Continued)

FOREIGN PATENT DOCUMENTS

WO    2012/082183    6/2012

OTHER PUBLICATIONS

International Search Report and the Written Opinion of the International Searching Authority issued in International Application PCT/US2023/020817 mailed Sep. 15, 2023.

(Continued)

*Primary Examiner* — Jennifer C Chiang

(57) ABSTRACT

A tooth sensitivity treatment device and an applicator tip thereof. The tooth sensitivity treatment device may be configured to dispense a sensitivity formulation onto a user's teeth. The tooth sensitivity treatment device may further be configured to massage the sensitivity formulation onto the user's teeth after dispensing. The applicator may have a bottom end, a top end, and a longitudinal axis extending therebetween. The applicator may include an application portion that is not intersected by the longitudinal axis. The application portion may have an outer surface that is oriented at an oblique angle relative to the longitudinal axis. The applicator may include a resilient material component and a rigid material component that are integrally coupled together. The resilient material component may form the entirety of the application portion to increase flexibility while massaging the sensitivity formulation onto the user's teeth.

20 Claims, 11 Drawing Sheets

(56) References Cited

U.S. PATENT DOCUMENTS

| | | | |
|---|---|---|---|
| 7,309,185 B2 | 12/2007 | Thorpe et al. | |
| 7,476,048 B2 | 1/2009 | Prague | |
| D605,406 S | 12/2009 | Wagner | |
| 7,891,899 B2 * | 2/2011 | Tani | A45D 34/04 401/265 |
| 8,297,869 B2 | 10/2012 | Gueret | |
| 8,328,449 B2 * | 12/2012 | Wightman | A46B 11/0058 401/265 |
| D674,905 S | 1/2013 | Lowsky | |
| 8,727,652 B2 | 5/2014 | Jimenez et al. | |
| 8,756,743 B2 | 6/2014 | Baertschi et al. | |
| 8,764,335 B2 | 7/2014 | Uehara | |
| 8,882,380 B2 | 11/2014 | Jimenez et al. | |
| 8,979,785 B2 | 3/2015 | Korogi et al. | |
| 9,072,371 B2 | 7/2015 | Jimenez et al. | |
| 9,125,484 B2 | 9/2015 | Gatzemeyer | |
| 9,173,477 B2 | 11/2015 | Jimenez et al. | |
| 9,210,987 B2 | 12/2015 | Dwyer | |
| D756,658 S | 5/2016 | Capozza et al. | |
| 9,398,803 B2 | 7/2016 | Jimenez et al. | |
| 9,427,076 B2 | 8/2016 | Jimenez et al. | |
| 9,603,436 B2 | 3/2017 | Miyamoto | |
| 10,426,252 B2 | 10/2019 | Moskovich et al. | |
| 10,433,941 B2 | 10/2019 | Frymark et al. | |
| 10,702,052 B2 | 7/2020 | Jimenez et al. | |
| D899,093 S | 10/2020 | Okai et al. | |
| D903,098 S | 11/2020 | Tom | |
| D906,520 S | 12/2020 | Wang | |
| D909,577 S | 2/2021 | Wang | |
| D910,175 S | 2/2021 | Tegowski et al. | |
| 11,000,115 B2 | 5/2021 | Baker | |
| 11,033,096 B2 | 6/2021 | Bloch et al. | |
| D947,540 S | 4/2022 | Wang | |
| 2008/0044220 A1 * | 2/2008 | Hsieh | A45D 34/04 401/265 |
| 2010/0035202 A1 | 2/2010 | Clarot et al. | |
| 2015/0157122 A1 | 6/2015 | Prescott | |
| 2017/0035185 A1 | 2/2017 | Littlewood | |
| 2017/0238672 A1 | 8/2017 | Moskovich | |
| 2022/0054373 A1 * | 2/2022 | Curtis | A61K 8/73 |

OTHER PUBLICATIONS

Nest Brush: Self-dispensing Electric Toothbrush, kickstarter.com, first available Aug. 17, 2021 [online], [site visited Sep. 19, 2023], Available from internet, URL: https://www.kickstarter.com/projects/1232189306/self-dispensing-uv-c-toothbrush-by-nest-brush (Year:2021).

* cited by examiner

ORAL CAVITY TREATMENT DEVICE

CROSS-REFERENCE TO RELATED APPLICATIONS

The present application claims the benefit of priority to U.S. Provisional Patent Application Ser. No. 63/343,894, filed May 19, 2022, the entirety of which is incorporated herein by reference.

BACKGROUND

Studies have shown that at least one in eight adults may have tooth sensitivities, although it is possible that such sensitivities of the teeth are underreported. There are currently different types of toothpaste available which include tooth sensitivity treatment. While this is a good way to provide some treatment, particularly because most people already brush their teeth twice a day, many consumers require a more specified treatment which may be available at times other than when the user is brushing his or her teeth. There are some dedicated tooth sensitivity treatments that are available, but they either do not adequately massage the formulation onto the teeth to maximize the relief or they require the user to massage the formulation onto the teeth with his or her fingers, making for a messy application process. Thus, a need exists for a tooth sensitivity treatment device and/or an applicator thereof that can efficiently and effectively dispense and massage a sensitivity formulation onto the user's teeth.

BRIEF SUMMARY

The present invention is directed to an oral cavity treatment device and an applicator tip thereof. The oral cavity treatment device may be a tooth sensitivity treatment device and it may be configured to dispense a sensitivity formulation onto a user's teeth. The tooth sensitivity treatment device may further be configured to massage the sensitivity formulation onto the user's teeth after dispensing. The applicator may have a bottom end, a top end, and a longitudinal axis extending therebetween. The application portion may have an outer surface that is oriented at an oblique angle relative to the longitudinal axis without being intersected by the longitudinal axis. The applicator may include a resilient material component and a rigid material component that are integrally coupled together. The resilient material component may form the entirety of the application portion to increase flexibility while massaging the sensitivity formulation onto the user's teeth.

In one aspect, the invention may be a tooth sensitivity treatment device comprising: a handle comprising a reservoir containing a tooth sensitivity formulation; an applicator configured to be coupled to the handle, the applicator comprising: a bottom end, a top end, and a longitudinal axis extending between the bottom and top ends; an inner surface that defines a dispensing passageway that is fluidly coupled to the reservoir of the handle when the applicator is coupled to the handle; and an application portion for dispensing and massaging the tooth sensitivity formulation onto a user's teeth, the application portion having an outer surface that is oriented at an acute angle relative to the longitudinal axis and a dispensing aperture through which the tooth sensitivity formulation is dispensed, and wherein the longitudinal axis does not intersect the outer surface of the application portion.

In another aspect, the invention may be an oral cavity treatment device comprising: a handle comprising a reservoir containing an oral cavity treatment composition; an applicator configured to be coupled to the handle, the applicator comprising: an inner surface defining a dispensing passageway comprising a first portion extending along a first axis and a second portion extending along a second axis that is angled relative to the first axis; a connector portion comprising an outer surface formed from a rigid material, the connector portion being configured to engage with the handle when the applicator is coupled to the handle; a body portion comprising a shell formed from a resilient material and a core formed from the rigid material; and an application portion comprising a distal section that is formed entirely from the resilient material, the application portion comprising a dispensing aperture that forms an outlet of the dispensing passageway, the distal section of the application portion comprising a distal portion of the first portion of the dispensing passageway and an entirety of the second portion of the dispensing passageway.

In yet another aspect, the invention may be an applicator for dispensing and massaging a tooth formulation onto a user's teeth, the applicator comprising: a resilient material component comprising a body portion, an application portion, and a longitudinal axis, the resilient material component comprising an inner surface that defines an interior passageway that extends from an inlet opening in a bottom end of the resilient material component to a dispensing aperture formed in the application portion, the interior passageway comprising a first portion that is elongated along the longitudinal axis and a second portion that is angled relative to the first portion and extends to the dispensing aperture; a rigid material component comprising a tubular portion that nests within a proximal portion of the first portion of the interior passageway of the resilient material component and a connection portion that is configured to couple the applicator to a handle; wherein a distal-most portion of the applicator that comprises a distal portion of the first portion of the interior passageway and an entirety of the second portion of the interior passageway is formed solely by the resilient material component; and wherein the resilient material component and the rigid material component are integrally connected together to form a unitary applicator assembly.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION

Figure 1:
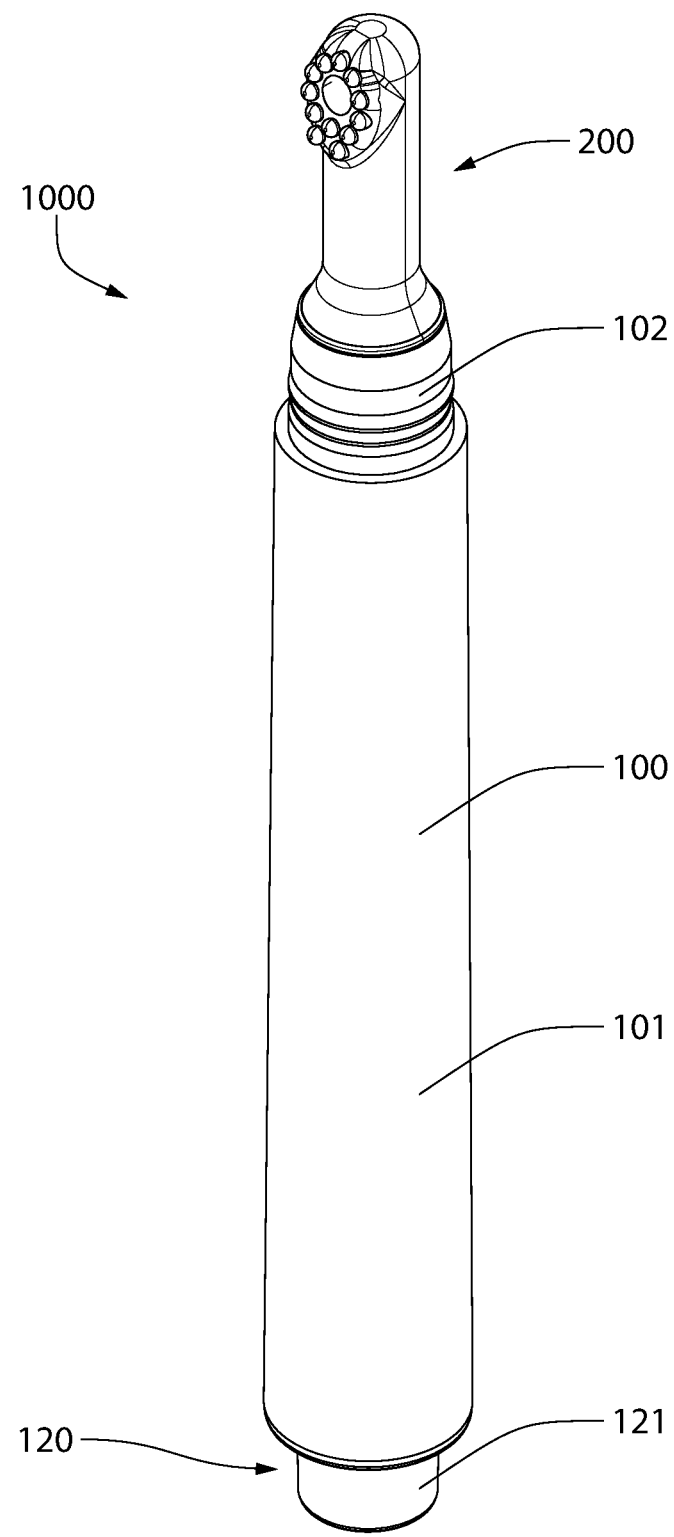
FIG. 1 is a front perspective view of a tooth sensitivity treatment device in accordance with an embodiment of the present invention.

The following description of the preferred embodiment(s) is merely exemplary in nature and is in no way intended to limit the invention, its application, or uses.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivatives thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the exemplified embodiments. Accordingly, the invention expressly should not be limited to such exemplary embodiments illustrating some possible non-limiting combination of features that may exist alone or in other combinations of features; the scope of the invention being defined by the claims appended hereto.

Figure 2:
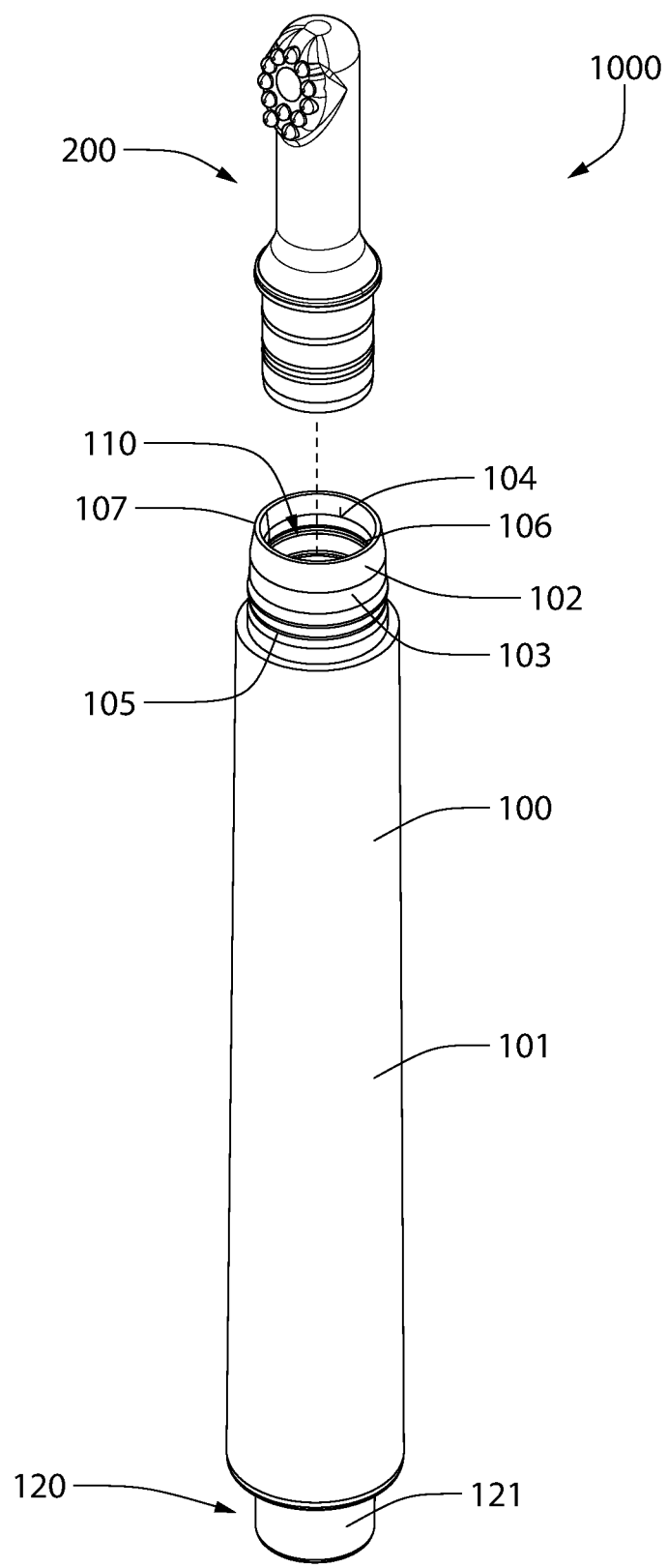
FIG. 2 is a front perspective view of the tooth sensitivity treatment device of FIG. 1 with an applicator thereof detached from a handle thereof.
Figure 3:
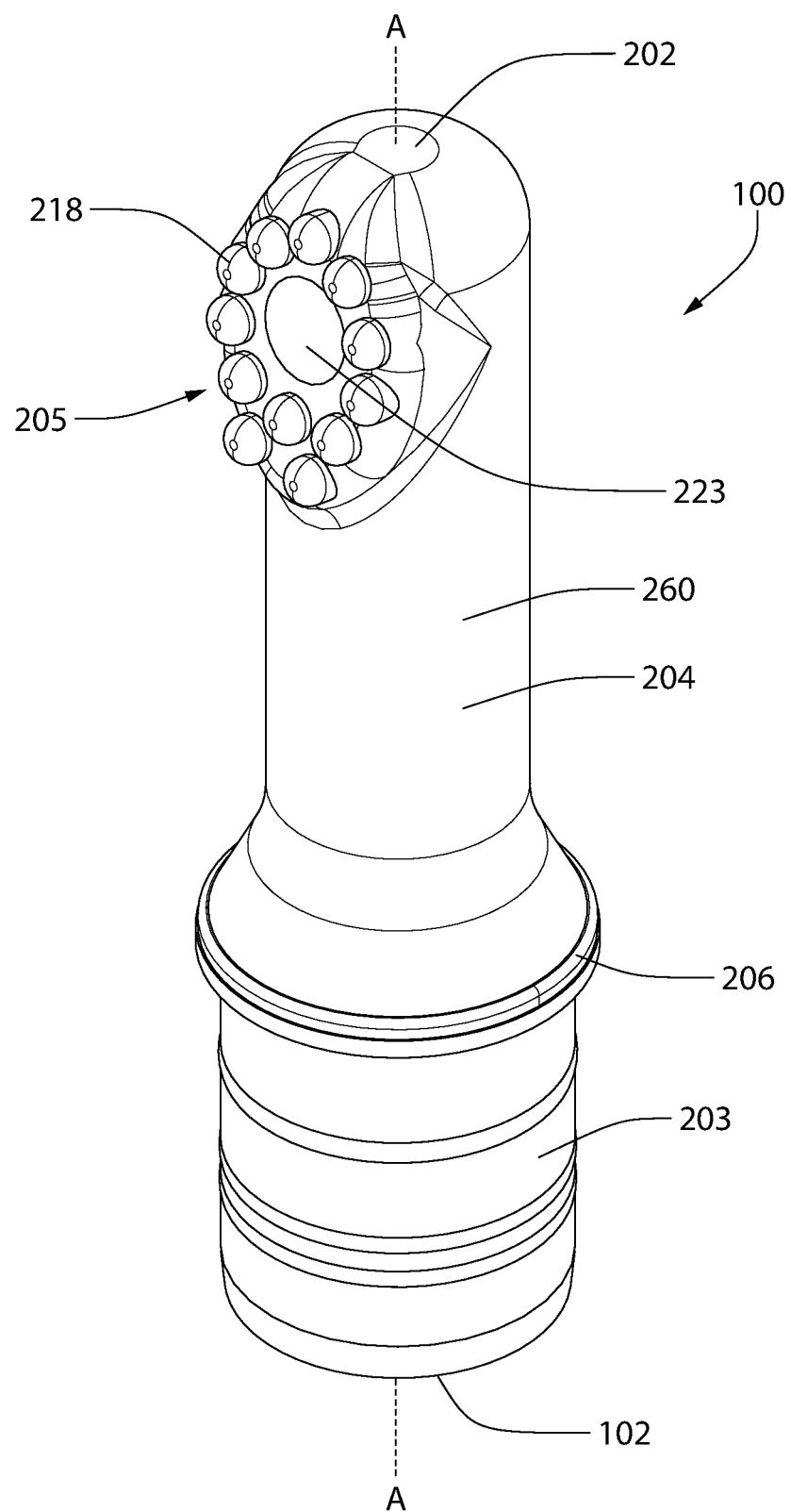
FIG. 3 is a front perspective view of the applicator of the tooth sensitivity treatment device if FIG. 1.
Figure 4:
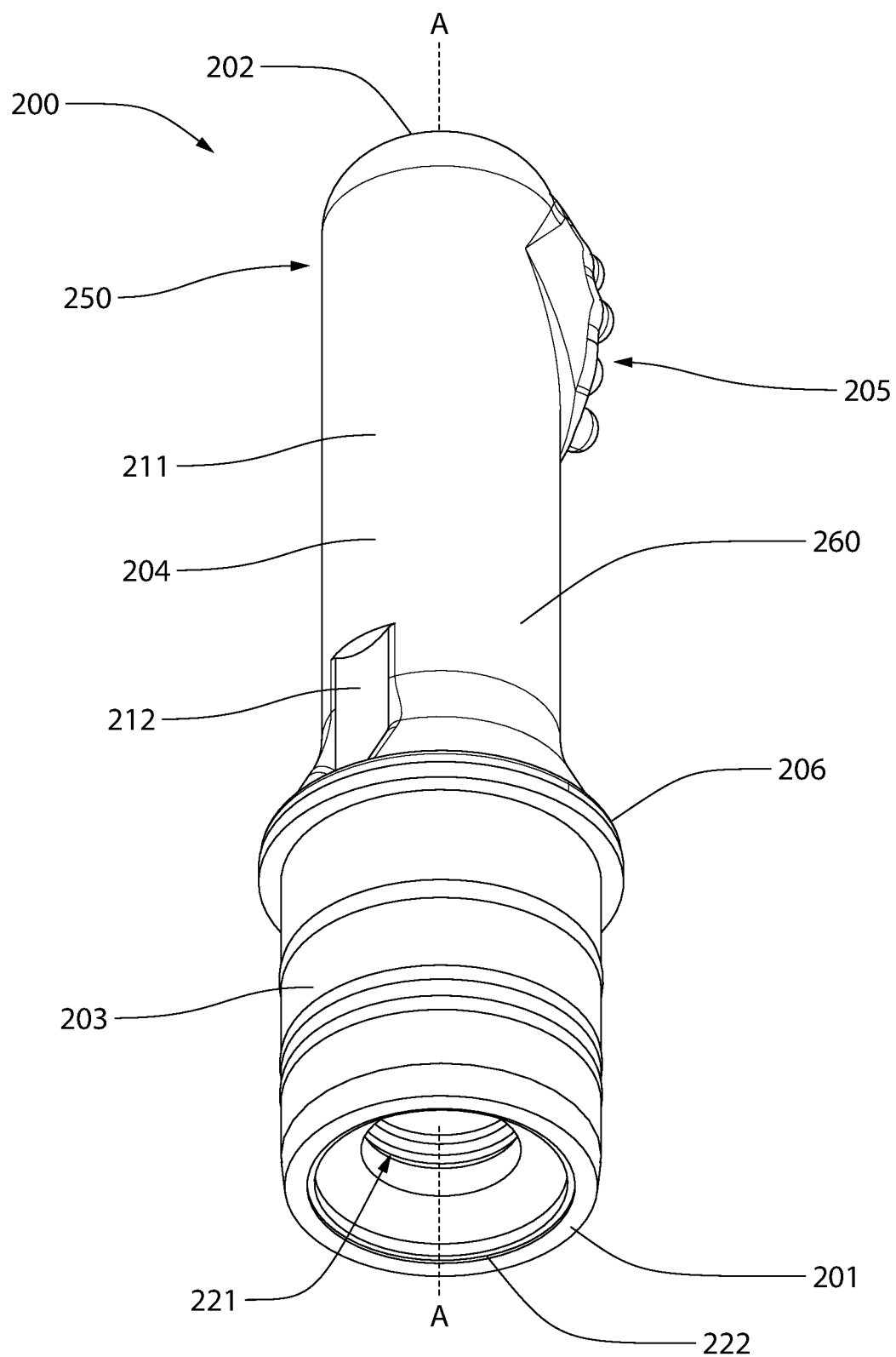
FIG. 4 is a rear perspective view of the applicator of FIG. 3.

Referring to FIGS. 1 and 2, an oral cavity treatment device 1000 will be described. The oral cavity treatment device 1000 generally comprises a handle 100 and an applicator 200. The applicator 200 may be detachable from the handle 100 in some embodiments, for example to allow the handle 100 to be refilled once its contents are depleted. However, the invention is not to be so limited in all embodiments and the applicator 200 may be permanently affixed to the handle 100 in other embodiments, with the entire oral cavity treatment device 1000 being discarded once the contents are depleted.

Figure 10:
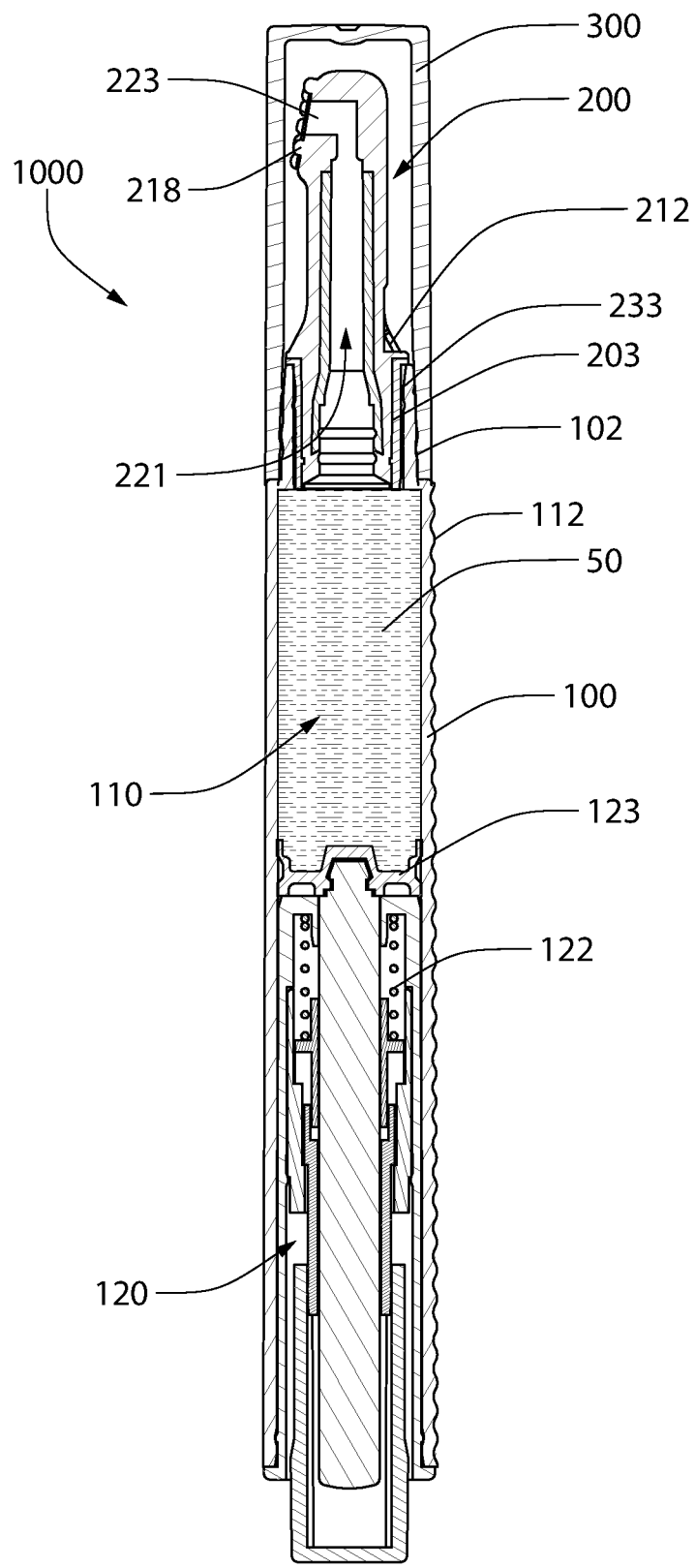
FIG. 10 is a cross-sectional view taken along line X-X of FIG. 9.

The handle 100 comprises a reservoir 110 which may be configured to contain an oral cavity treatment composition (or an oral care composition, generally). Of course, in embodiments where the device is not being used to treat the oral cavity, the composition may be a skin care composition, a hair care composition, a lip care composition, or any other type of composition suited for its intended purpose. FIG. 10 illustrates the oral cavity treatment composition 50 located within the reservoir 110 of the handle 100. The oral cavity treatment composition 50 may be any composition specifically tailored to treat an oral cavity ailment, such as tooth and/or gum sensitivity, bad breath, tooth stains, gum inflammation, periodontal disease, gingivitis, canker sores, ulcers, or the like. In one specific embodiment, the oral cavity treatment composition 50 may comprise a tooth sensitivity composition. That is, the oral cavity treatment device 1000 may be specifically designed and configured to dispense and massage a tooth sensitivity formulation onto a user's teeth. In some embodiments, the tooth sensitivity formulation may be an Arginine-CaCO3 (Calcium carbonate) formulation. The tooth sensitivity formulation may contain between 30% and 40%, and more specifically approximately 35% Calcium carbonate. The tooth sensitivity formulation may contain between 15% and 25%, and more specifically between 19% and 20% Arginine bicarbonate solution, which may be dispensed/delivered as a liquid or gel having between 7% and 10%, and more specifically approximately 8% arginine. The term approximately as used herein may include a tolerance of plus or minus 0.5%. The tooth sensitivity formulation may be in the form of a liquid, which may be a gel.

Arginine bicarbonate is a salt of naturally derived arginine which has known oral health benefits. Arginine is a naturally occurring amino acid in plants and can be derived via natural fermentation of plant materials that contain sugars such as sucrose. Arginine may be dissolved in pure water and then treated with carbon dioxide gas to form an arginine bicarbonate solution, a more concentrated and convenient way to incorporate the required amount of arginine (for example, the 8% by weight of dispensed arginine) into the formulation. Arginine bicarbonate may be used together with calcium carbonate to help seal open dentin tubules and thus reduce the pain of tooth sensitivity.

While the invention is being described whereby the oral care composition 50 is a tooth sensitivity formulation, the invention is not to be so limited in all embodiments. In other embodiments the oral cavity treatment device 1000 may contain and dispense other types of oral care compositions, such as tooth whitening compositions, gum inflammation treatment compositions, breath freshening agents, or the like. Furthermore, while the device is described herein as being one used within the oral cavity to treat oral care ailments, the invention is not to be so limited in all embodiments. The device 1000 may be used to dispense and apply a composition onto the user's skin externally of the mouth, onto the user's lips, onto the user's hair, or the like. Thus, the device 1000 may be put to uses other than those which are specifically described herein, and the composition may be modified as needed to treat the area on which it is being applied.

The handle 100 may comprise a dispensing mechanism 120. The dispensing mechanism 120 may comprise an actuator 121. In the exemplified embodiment, the actuator 121 is a press-button that protrudes from the bottom end of the handle 100. However, the actuator 121 could be a button located at other positions along the handle 100 in other embodiments. Moreover, referring briefly to FIG. 10, the dispensing mechanism 120 may comprise a spring 122 and an elevator mechanism 123. Thus, upon each actuation of the actuator 121, the elevator mechanism 123 may move upwardly within the reservoir 110 a certain distance, thereby causing the oral cavity treatment composition 50 to move through the applicator 200 to be dispensed onto the user's teeth. While the dispensing mechanism 120 is described herein as comprising a push button actuator and elevator mechanism, the invention is not to be so limited in all embodiments. In other embodiments, the dispensing mechanism 120 may comprise a rotating knob member, a squeezable/compressible handle, a pump assembly, or the like. Thus, the specific structure used to dispense the contents from the reservoir 110 is not to be limiting of the invention in all embodiments.

The handle 100 may comprise a main body portion 101 and a neck portion 102. The neck portion 102 may comprise an inner surface 104 and an outer surface 103, and the neck portion 102 may extend from the main body portion 101 to a distal end 107. The inner surface 104 may comprise one or more engagement features 106 configured to engage with the applicator 200 to facilitate the coupling of the applicator 200 to the handle 100. The one or more engagement features 106 may comprise indents, protuberances, screw threads, or the like that mate with similar or opposite style features on the applicator 200, as described in more detail below. The outer surface 103 of the neck portion 102 may also comprise one or more engagement features 105 which may be configured to mate with engagement features on a cover lid or cap member 500 (FIG. 10).

The handle 100 may be formed from plastic, such as polypropylene or the like. Alternatively, the handle 100 may be formed from metal or other generally rigid materials. The handle 100 may be sufficiently rigid such that it is not readily squeezable by a user and the dispensing mechanism 120 must be actuated to dispense the contents. In other embodiments, the handle 100 may be rigid (due to being formed from a hard plastic), but squeezable. In the exemplified embodiment, the handle 100, and particularly the main body portion 101 thereof, has a cylindrical tubular shape. The exact shape of the handle 100 is not to be limiting of the invention in all embodiments.

Referring to FIGS. 3-7, the applicator 200 will be described in greater detail. The applicator 200 comprises a bottom end 201, a top end 202, and a longitudinal axis A-A extending between the bottom and top ends 201, 202. The applicator 200 comprises a connection portion 203 which is configured to engage the handle 100 when the applicator 200 is coupled to the handle 100, a body portion 204, and a head portion 250. Each of the connection portion 203, the body portion 204 and the head portion 250 forms an axial section of the applicator 200 such that the body portion 204 is located axially between the head portion 250 and the connector portion 203. Thus, the connection portion 203 forms a proximal axial section of the applicator 200, the head portion 250 forms a distal axial section of the applicator 200, and the body portion 204 forms a central axial section of the applicator 200. The head portion 250 may comprise an application portion 205 which is designed to engage the teeth during application of the oral treatment composition thereon, described in more detail below.

The applicator 200 may comprise a flange 206 located between the connection portion 203 and the body portion 204. The flange 206 protrudes radially from a distal end of the connection portion 203 which is adjacent to the body portion 204. The flange 206 may form an abutment surface or stopper that abuts against the distal end 107 (FIG. 2) of the neck portion 102 of the handle 100 when the applicator 200 is coupled to the handle 100. Thus, the flange 206 may prevent the body portion 204 from passing into and through the opening in the distal end 107 of the neck portion 102 of the handle 100 during the coupling of the applicator 200 to the handle 100. When the applicator 200 is coupled to the handle 200, the connection portion 203 may nest within the neck portion 102 of the handle 100, the flange portion 206 may abut against the distal end 107 of the handle 100, and the body and head portions 204, 250 may protrude from the distal end 107 of the handle 100. The flange 206 may be a continuous annular flange, a discontinuous annular flange, a segmented flange, or the like.

The body portion 204 may comprise a conical section 208 located adjacent to the flange 206 and a cylindrical or tubular section 209 extending from the conical section 208 to the head portion 250 of the applicator 200. In other embodiments, the conical section 208 may be omitted and the body portion 204 may be cylindrical for its full length.

The applicator 200 comprises an outer surface 260. The applicator 200 may be divided into a front surface portion 210 and a rear surface portion 211 by a coronal plane Z-Z. Thus, the outer surface 260 of the applicator 200 comprises a front surface portion 210 and a rear surface portion 211 which are separated or divided by the coronal plane Z-Z. The applicator 200 comprises a alignment feature 212 located axially along the body portion 204 and circumferentially along the rear surface portion 211. In the exemplified embodiment, the alignment feature 212 is a notch. However, the invention is not to be so limited in all embodiments and the alignment feature 212 may take on other forms, such as being an indicia mark, a protuberance, or the like. The alignment feature 212 may be located along the rear surface portion 211 at a location that is adjacent to the flange 206. The alignment feature 212 may extend from the flange 206 upwardly along the body portion 204 for a desired distance.

The applicator 200 may comprise a proximal section 213 that nests within the handle 100 when the applicator 200 is coupled to the handle 100 and a distal section 214 that protrudes from the distal end 107 of the handle 100. Thus, the proximal section 213 may comprise the connection portion 203 and the distal section 214 may comprise the body portion 204, the head portion 250, and the flange 206. The alignment feature 212 may be located along the distal section 214 at a position that is adjacent to the flange portion 206 and/or adjacent to the distal end 107 of the handle 100 when the applicator 200 is coupled to the handle 100.

The head portion 250 of the applicator 250 may comprise an application portion 205. The application portion 205 may be located axially along the head portion 250 and circumferentially along the front surface portion 210 of the applicator 200. The rear surface portion 211 of the head portion 250 of the applicator 200 may be smooth and rounded similarly to the body portion 204 of the applicator 200. However, the front surface portion 210 of the head portion 250 of the applicator 200 which forms or comprises the application portion 205 takes on a different structure and configuration, as described in more detail below.

The application portion 205 is the portion of the applicator 200 which is configured to engage the user's teeth to massage the oral care composition thereon. The application portion 205 comprises an outer surface 215 that is angled relative to the longitudinal axis A-A. The outer surface 215 may be angled rearwardly moving in a direction from a lower end of the outer surface 215 towards a top end of the outer surface 215. In particular, the outer surface 215 of the application portion 205 lies in a plane B-B that intersects the longitudinal axis A-A at an acute angle. The acute angle may be between 5° and 20° in some embodiments, or more specifically between 5° and 15°, or still more specifically between 8° and 12°. Moreover, the longitudinal axis A-A of the applicator 200 does not intersect the outer surface 215 of the application portion 205. Stated another way, the plane B-B on which the outer surface 215 of the application portion 205 lies only intersects the longitudinal axis A-A at a distance beyond the top end 202 of the applicator 200.

Figure 5:
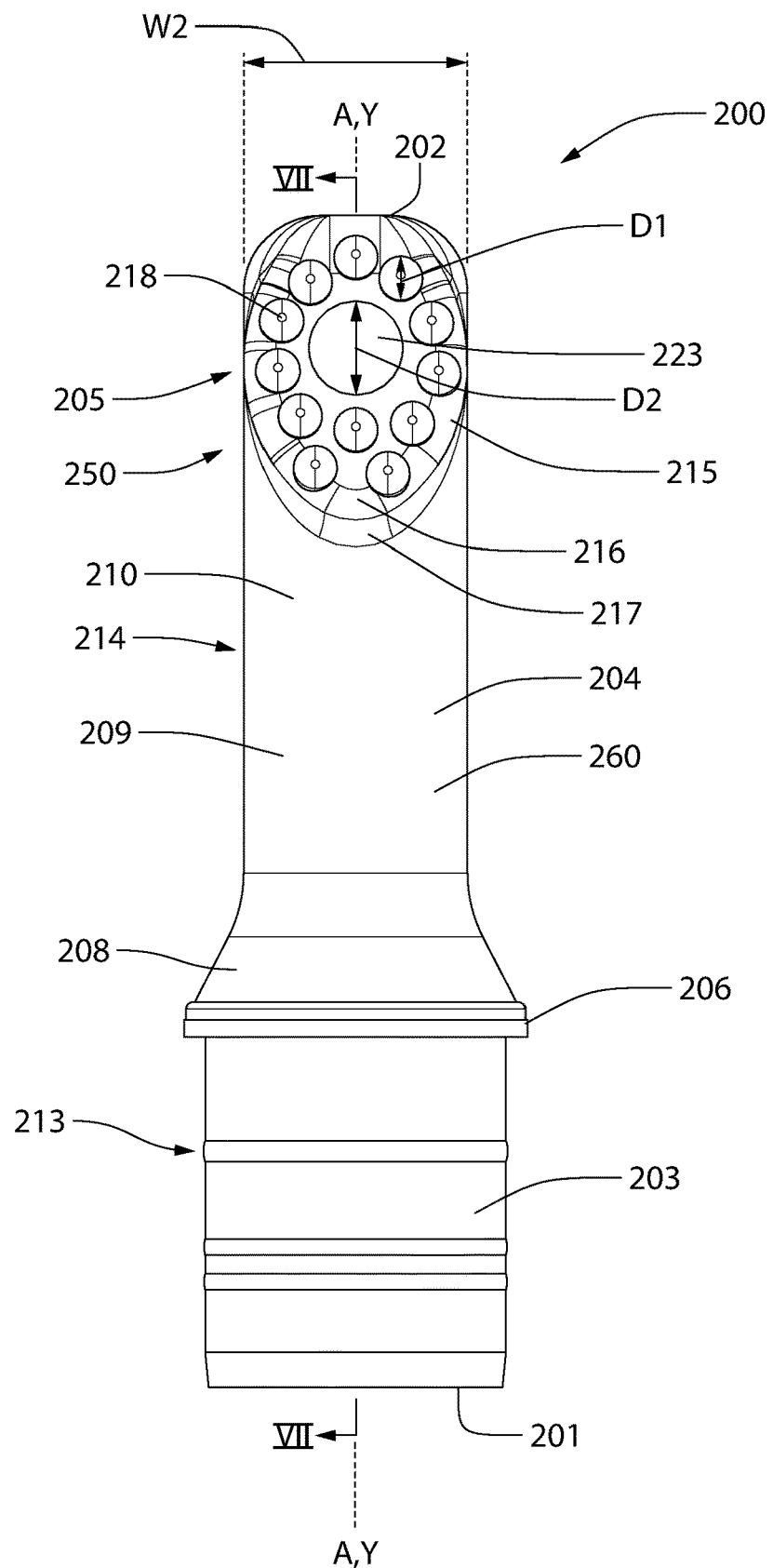
FIG. 5 is a front view of the applicator of FIG. 3.
Figure 6:
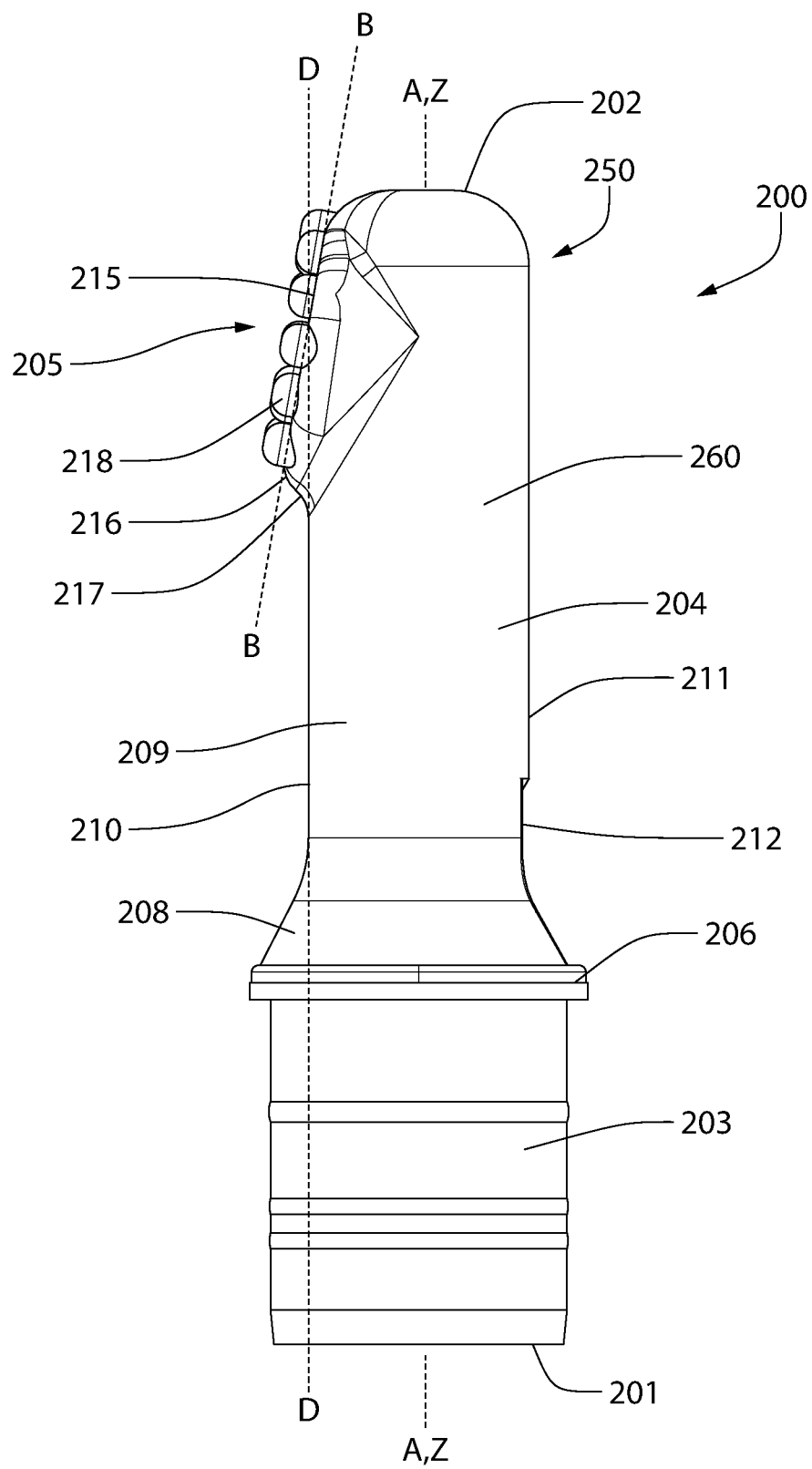
FIG. 6 is a side view of the applicator of FIG. 3.

The applicator 200 comprises a sagittal plane Y-Y (see FIG. 5) that divides the applicator 200 into a left side and a right side. Moreover, as best seen in FIG. 6, a portion of the front surface portion 210 of the body portion 204 of the applicator 200 which lies on the sagittal plane Y-Y extends along an axis D-D which intersects the outer surface 215 of the application portion 205. The axis D-D may intersect the outer surface 215 of the application portion 205 at, or along, the dispensing aperture 223. This occurs due to the outer surface 215 of the application portion 205 being elevated relative to the front outer surface 210 of the body portion 204 and due to the outer surface 215 of the application portion 205 being angled rearwardly as shown and described herein.

In the exemplified embodiment, a lower portion 216 of the outer surface 215 of the application portion 205 is elevated relative to the front surface portion 210 of the outer surface of the body portion 204. More specifically, the application portion 205 may comprise a lower edge portion 217 that extends from the front surface portion 210 of the outer surface 260 of the body portion 204 to the lower portion 216 of the outer surface 215 of the application portion 205. The lower edge portion 217 may face downwardly towards the bottom end 201 of the applicator 200. Thus, the transition from the front surface portion 210 of the outer surface 260 of the body portion 204 to the outer surface 215 of the application portion 205 is not flush and seamless. Rather, there is a step up from the front surface portion 210 of the body portion 204 to the outer surface 215 of the application portion 205, which adds some thickness and structural rigidity to the application portion 205 of the applicator 200.

The applicator 200 comprises an inner surface 220 that defines a dispensing passageway 221. The dispensing passageway 221 extends from an inlet opening 222 in the bottom end 201 of the applicator 200 to a dispensing aperture 223 in the application portion 205 of the head portion 250 of the applicator 200. The dispensing aperture 223 forms an opening in the outer surface 215 of the application portion 205.

The application portion 205 may also comprise a plurality of protuberances 218 that protrude from the outer surface 215 of the application portion 205. In the exemplified embodiment, the plurality of protuberances 218 surround the dispensing aperture 223. In the exemplified embodiment, the protuberances 218 have a diameter D1 and a height H1. A ratio of the diameter D1 to the height H1 may be in a range of 1.5:1 and 2:1, more specifically 1.6:1 and 1.8:1, and more specifically 1.65:1 and 1.75:1. Thus, the diameter D1 of the protuberances 218 may be greater than the height H1 of the protuberances 218. This may be beneficial in certain embodiments whereby the protuberances 218 are configured to be used to massage the oral treatment composition (e.g., the tooth sensitivity formulation) onto the teeth. In particular, by forming the protuberances 218 with a diameter D1 that is greater than the height H1, the protuberances 218 will be reasonably sturdy, thereby allowing them to effectively massage the oral treatment composition onto the teeth. While the protuberances 218 may be formed out of a resilient material as described further below, thereby giving them some flexibility, that flexibility is minimized as a result of the diameter D1 to height H1 ratio. If the protuberances 218 were taller and thinner, they would flex too much during contact with the teeth and would therefore be less effective at massaging the oral treatment composition onto the teeth and into the tubules of the teeth.

In an embodiment the diameter D1 of the protuberances 218 may be between 0.25 mm and 3 mm. In an embodiment, height H1 of the protuberances may be between 0.5 mm and 1.75 mm. In an embodiment, the ratio of the diameter D1 to the height H1 may be in a range of 0.1:1 and 6:1. Variations in the diameter D1 and height H1 of the protuberances 218 may be possible in other embodiments, including making the protuberances 218 longer and thinner or shorter and thinner or longer and thicker or shorter and thicker or other combinations of modifications.

In the exemplified embodiment, there are twelve of the protuberances 218 arranged around the dispensing aperture 223. The invention is not to be so limited in all embodiments and there could be more or less than twelve of the protuberances 218 in other embodiments. Furthermore, the protuberances 218 may not surround the dispensing aperture 223 in all embodiments but may be positioned along a portion but not an entirety of the circumference of the dispensing aperture 223. Furthermore, the spacing between the protuberances 218 may be modified from that which is depicted in the drawings.

In the exemplified embodiment, the dispensing aperture 223 has a diameter D2 that is at least twice the diameter D1 of the protuberances 218. Moreover, the application portion 205 of the applicator 200 may have a width W2 measured between the opposing sides thereof, as best shown in FIG. 5. A ratio of the width W2 of the application portion 205 to the diameter D2 of the dispensing aperture 223 may be between 2:1 and 2.5:1, and more specifically between 2.2:1 and 2.4:1. Thus, the width W2 of the application portion 205 may be slightly greater than twice the diameter D2 of the dispensing aperture 223. Stated another way, the diameter D2 of the dispensing aperture 223 may extend across between 40% and 45% of the width W2 of the application portion 205. This enlarged dispensing aperture 223 may reduce the appearance of oozing out when the composition is being dispensed.

The diameter D2 may be selected and modified depending on the viscosity of the material being dispensed. For example, when the oral cavity dispenser 1000 is dispensing a composition with a higher viscosity, the diameter D2 of the dispensing aperture 223 may be larger whereas when the oral cavity dispenser 1000 is dispensing a composition with a lower viscosity, the diameter D2 of the dispensing aperture 223 may be smaller. In some embodiments, the viscosity of the composition being dispensed may be between 400,000 centipoise and 600,000 centipoise, and this embodiment may include a dispensing aperture 223 with a larger aperture. In other embodiments, the same applicator may be used to dispense a lower viscosity material, such as one with a viscosity of 100 centipoise or lower. In such embodiments, the diameter D2 of the dispensing aperture 223 will be reduced. In one embodiment, the diameter D2 of the aperture 223 may be between 1 mm and 5 mm, more specifically between 2 mm and 4 mm, more specifically between 2 mm and 3 mm, and more specifically between 2.5 mm and 3 mm.

In some embodiments, a check valve may also be incorporated into the applicator 200 or between the applicator 200 and the handle 100. For example, a check valve may be desirable when the oral cavity dispenser 1000 is dispensing compositions having a lower viscosity (i.e., a viscosity of 100 centipoise or lower). Such a check valve will prevent the composition that is located within the dispensing passageway 221 of the applicator 200 from draining back into the reservoir 110 of the handle 100 after use. Compositions with a higher viscosity will not readily drain back into the reservoir 110 due to the higher viscosity. Preventing draining of the unused composition from the dispensing passageway 221 back into the reservoir 110 may be desirable in some embodiments to prevent any saliva that may have mixed with the unused composition in the dispensing passageway 221 from entering into the composition 50 in the reservoir 110, which could create contamination.

The dispensing passageway 221 may comprise a first portion (or vertical portion) 224 and a second portion (or horizontal portion) 225. The first portion 224 may extend along an axis which is coaxial with the longitudinal axis A-A of the applicator 200 from the opening 222 in the bottom end 201 of the applicator 200 to the second portion 225. The second portion 225 may extend at an angle relative to the first portion 224 and may extend from the distal end of the first portion 224 to the dispensing aperture 223. In the exemplified embodiment, the second portion 225 is perpendicular to the first portion 224. Moreover, the second portion 225 may extend along an axis C-C that is oblique relative to the plane B-B on which the outer surface 215 of the application portion 205 of the applicator 200 lies. The second portion 225 may have a length L3 which is greater than half of a thickness T1 of the applicator 200 measured from the outer surface 215 of the application portion 205 to the rear surface portion 211. A ratio of the thickness T1 to the length L3 may be in a range of 1.2:1 and 2:1, more specifically 1.3:1 and 1.7:1, and still more specifically 1.5:1 and 1.6:1. The second portion 225 of the dispensing passageway 221 may have a constant cross-sectional area as it extends from the first portion 224 of the dispensing passageway 221 to the dispensing aperture 223.

Forming the dispensing passageway 221 in the manner described above may ensure that a user is better able to apply the composition onto the back teeth and molars using the oral cavity treatment device 1000. In particular, if the dispensing passageway 221 included only the vertical portion 224, a user might find it very difficult to apply the composition onto the molars because of the angle at which the oral cavity treatment device 1000 would have to be oriented relative to the user's mouth. By having the dispensing passageway 221 include a second portion 225 which may extend perpendicularly relative to longitudinal axis A-A of the oral cavity treatment device 1000, a user can hold the device comfortably while dispensing and applying the composition onto the back teeth and molars.

Figure 7:
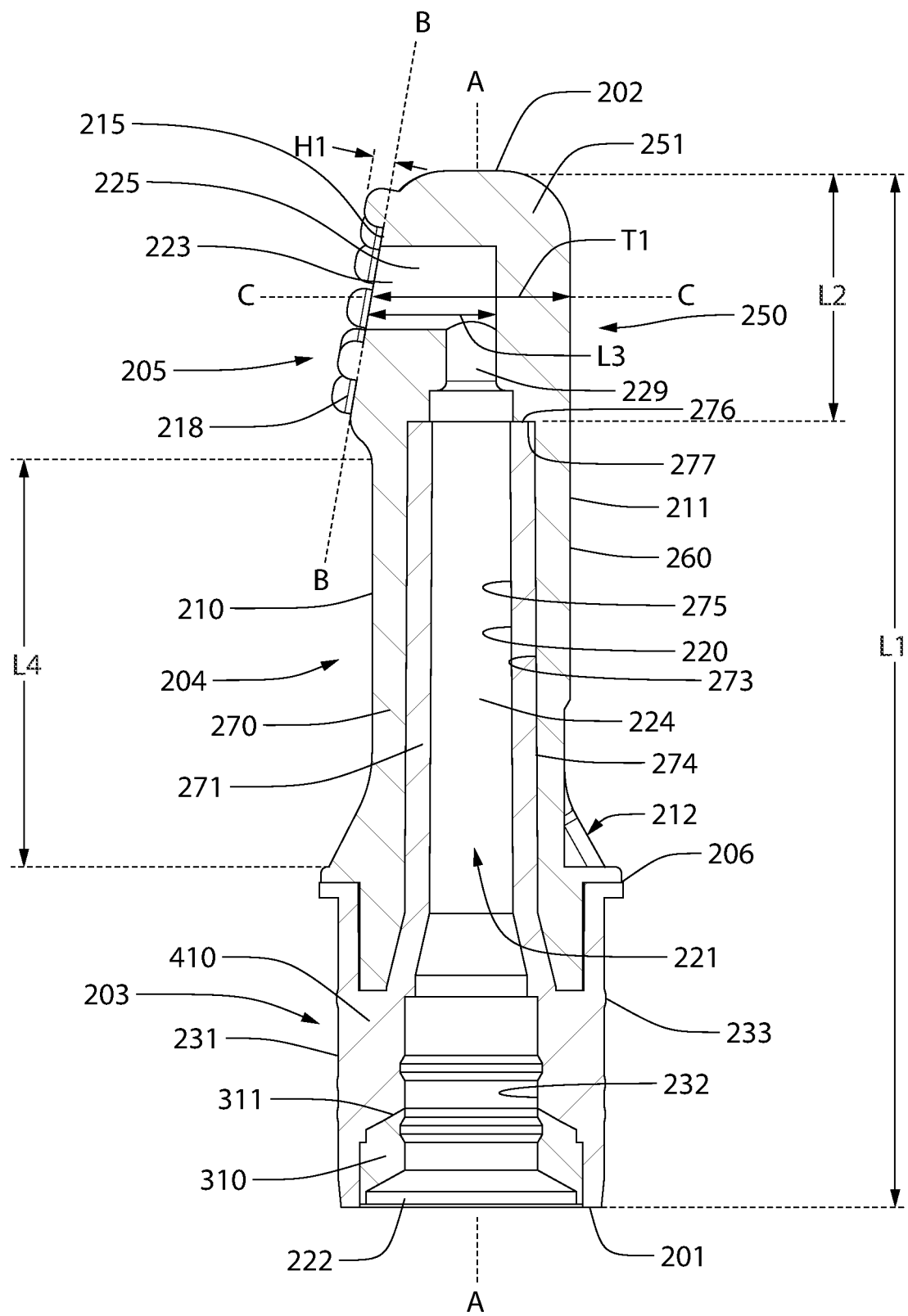
FIG. 7 is a cross-sectional view taken along line VII-VII of FIG. 5.
Figure 8:
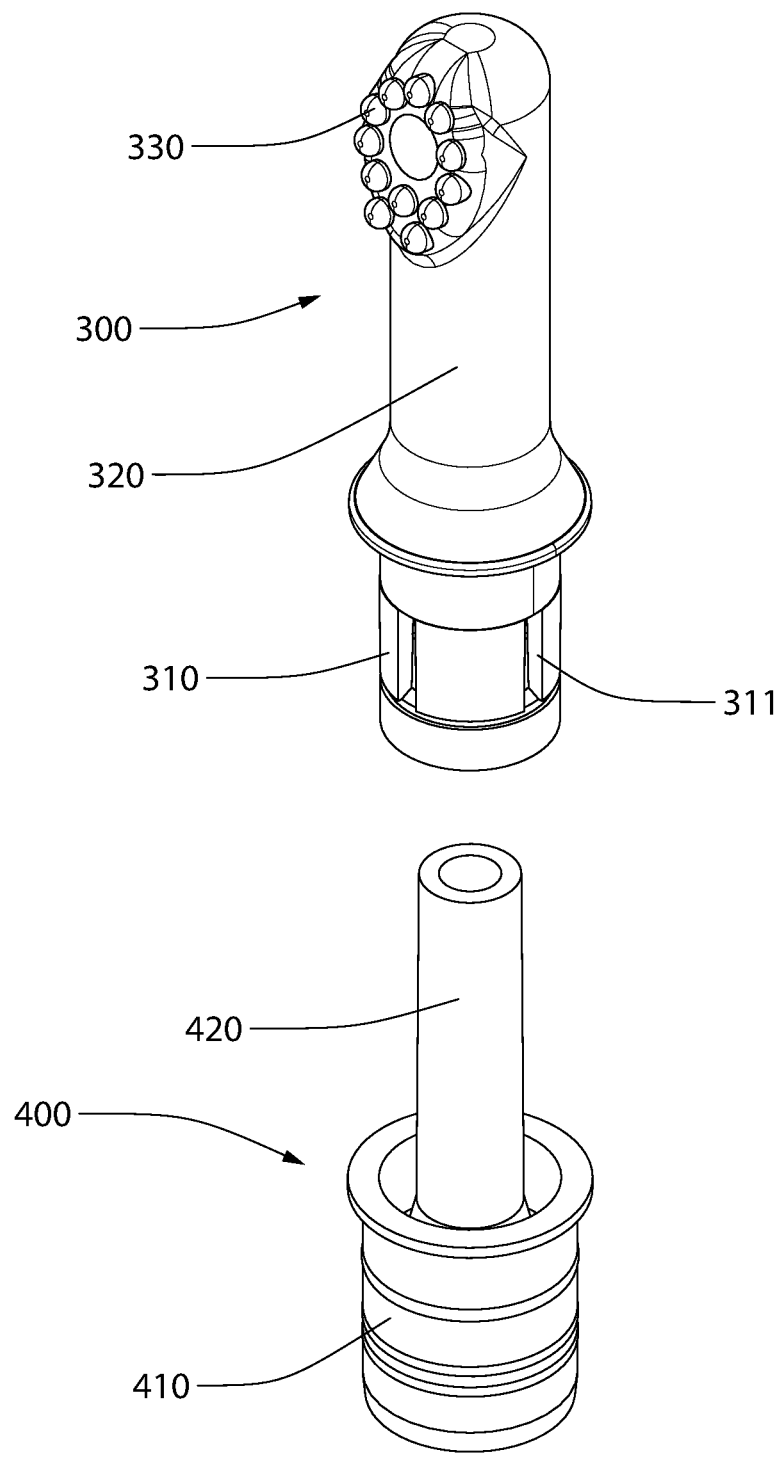
FIG. 8 is an exploded view of the applicator of FIG. 3 illustrating resilient and rigid components thereof.

Referring to FIGS. 7 and 8, the material makeup of the applicator 200 will be described. As shown in FIG. 8, the applicator 200 comprises a resilient material component 300 and a rigid material component 400. The resilient and rigid material components 300, 400 are integrally bonded together during the manufacturing process to form the applicator 200. In general, the rigid material component 400 may be injection molded onto the resilient material component 300 to create the final assembled applicator 200. The resilient material component 300 may be a thermoplastic elastomer, a thermoplastic polyurethane, silicone, or other resilient, flexible, rubbery materials. The rigid material component 400 may be formed from a hard plastic such as polypropylene, polyethylene, polyethylene terephthalate, polyvinyl chloride, acrylonitrile-butadiene-styrene, or the like.

The resilient material component 300 comprises a connection portion 310, a body portion 320, and a head portion 330. The connection portion 310 comprises one or more apertures 311. The rigid material component 400 comprises a connection portion 410 and a tubular portion 420. During manufacture, the rigid material component 400 may be injection molded onto the pre-formed resilient material component 300. During such injection molding, the rigid material component 400 may pass into/through the apertures 311 in the connection portion 310. This allows the connection portion 410 of the rigid material component 400 to form the outer surface of the connection portion 203 of the applicator 200 while the tubular portion 420 forms a core of the body portion 204 of the applicator 200, as best seen in FIG. 7.

Thus, the connector 203 of the applicator 200 may comprise an outer surface 231 formed from the rigid material of the rigid material component 400 and an inner surface 232 formed partially from the rigid material of the rigid material component 400 and partially from the resilient material of the resilient material component 300. This is made possible due to the apertures 311 in the connection portion 310 of the resilient material component 300. The outer surface 231 of the connector 203 which is formed by the rigid material component 400 may comprise one or more protrusions 233 which are configured to engage with recesses in the neck portion 102 of the handle 100 for purposes of coupling the applicator 200 to the handle 100. In other embodiments the protrusions 233 may be omitted and the engagement between the connector 203 and the handle 100 may be via friction fit, threaded screw engagement, or the like.

The body portion 204 of the applicator 200 may comprise a shell 270 formed from the resilient material of the resilient material component 300 and a core 271 formed from the rigid material of the rigid material component 400. More specifically, the core 271 may be formed by the tubular portion 420 of the rigid material component 400. The shell 270 may comprise an inner surface 273 that defines an interior passageway. The core 271 may be located within the interior passageway so that an outer surface 274 of the core 271 is in contact with the inner surface 273 of the shell 270. Thus, along the body portion 204 of the applicator 200, an inner surface 275 of the core 271 defines and surrounds the dispensing passageway 221. The core 271 (i.e., the tubular portion 420) may comprise a distal end 276. Furthermore, the resilient material component 300 may comprise a downwardly facing shoulder 277. The distal end 276 of the core 271 or the tubular portion 420 of the rigid material component 400 may abut against the downwardly facing shoulder 277.

The tubular portion 420 of the rigid material component 400 may extend just slightly into the head portion 250 of the applicator 200. However, in other embodiments this need not be the case and the tubular portion 420 may not extend into the head portion 250 of the applicator 200 at all. In either case, at least the majority of the head portion 250 of the applicator 200, for example at least 90% or at least 95% of the length of the head portion 250 of the applicator 200, is formed entirely from the resilient material of the resilient material component 300. Thus, for the example, the applicator 200 may have a length L1 measured from the bottom end 201 to the top end 202. The head portion 250 may comprise a distal section 251 which extends from the distal end 276 of the core 271 (which is the distal end of the tubular portion 420 of the rigid material component 400) to the top end 202 of the applicator 200. The distal section 251 may have a length L2. The length L2 of the distal section 251 of the head portion 250 may be at least 20% of the length L1 of the applicator 200. More specifically, the length L2 of the distal section 251 of the head portion 250 may be between 20% and 30% of the length L1 of the applicator 200. Thus, the distal-most 20-30% of the applicator 200 is formed entirely by the resilient material. As a result, the distal-most 20-30% of the applicator 200, which includes most if not all of the application portion 205, has more flexibility than the rest of the applicator 200, making it effective at dispensing and massaging the oral cavity treatment composition onto the teeth and other oral cavity surfaces of the user.

The body portion 204 of the applicator 200 may have a length L4. The length L4 of the body portion 204 may be greater than the length L2 of the distal section 251 of the head portion 250. In one embodiment, a ration of the length L4 of the body portion 204 to the length L2 of the distal section 251 of the head portion 250 may be between 1.5:1 and 1.8:1, and more specifically between 1.6:1 and 1.7:1.

The distal section 251 of the head portion 250 of the applicator 200, which is formed entirely by the resilient material 200, comprises a distal portion 229 of the first portion 224 of the dispensing passageway 221 and the entirety of the second portion 225 of the dispensing passageway 221. Thus, an L-shaped portion of the dispensing passageway 221 is located within and/or formed by the distal section 251 of the head portion 250 and is defined entirely by the resilient material component 300 of the applicator 200. In the exemplified embodiment, there is no axis perpendicular to the first axis (which is coaxial with the longitudinal axis A-A) that intersects the distal portion 229 of the first portion 224 of the dispensing passageway 221 and also intersects the dispensing aperture 223.

The distal portion 229 of the first portion 224 of the dispensing passageway 221 has a diameter or a transverse cross-sectional area which may be less than a portion of the first portion 224 of the dispensing passageway 221 which is upstream of the distal portion 229. That is, the diameter or transverse cross-sectional area of the dispensing passageway 221 may decreases at the distal portion 229 relative to the portions upstream of the distal portion 229. In the exemplified embodiment, the diameter or transverse cross-sectional area of the distal portion 229 of the dispensing passageway 221 is constant, although this is not required in all embodiments. The second portion or horizontal portion 225 of the dispensing passageway 221 has a diameter or transverse cross-sectional area that may be greater than the diameter or cross-sectional area of the distal portion 229 of the first portion 224 of the dispensing passageway 221. The second portion 225 of the dispensing passageway 221 may extend from the dispensing aperture 223 to a wall formed by a portion of the inner surface of the head portion of the applicator.

The rigid material component 400 may be beneficial in facilitating the connection between the applicator 200 and the handle 100. The rigid material component 400 also provides structural integrity to the applicator 200 so that as a user is massaging a dispensed treatment composition onto the user's teeth and applying some force onto the teeth with the outer contact surface 215 of the application portion 205, the applicator 200 does not simply bend in half and become unusable. Rather, the applicator 200 will maintain its upright configuration due at least in part to the tubular portion 420 of the rigid material component 400 being located within the interior of the resilient material component 300 along the body portion 204 of the applicator 200. Furthermore, because the resilient material component 300 forms the entirety of the exterior surface of the applicator 200 which is intended to engage the user's teeth, a soft and conformal engagement is achieved.

The material construction of the device 1000 is intended to correlate with a human finger. In particular, a human finger has a hard core (the skeletal bone) and a softer shell (the skin and tissue). Thus, the rigid material component 400 is intended to correlate to the skeletal bone of the finger and the resilient material component 300 is intended to correlate to the skin of the finger. Thus, the application using the applicator 200 is similar to application using a finger, although more sanitary.

Figure 9:
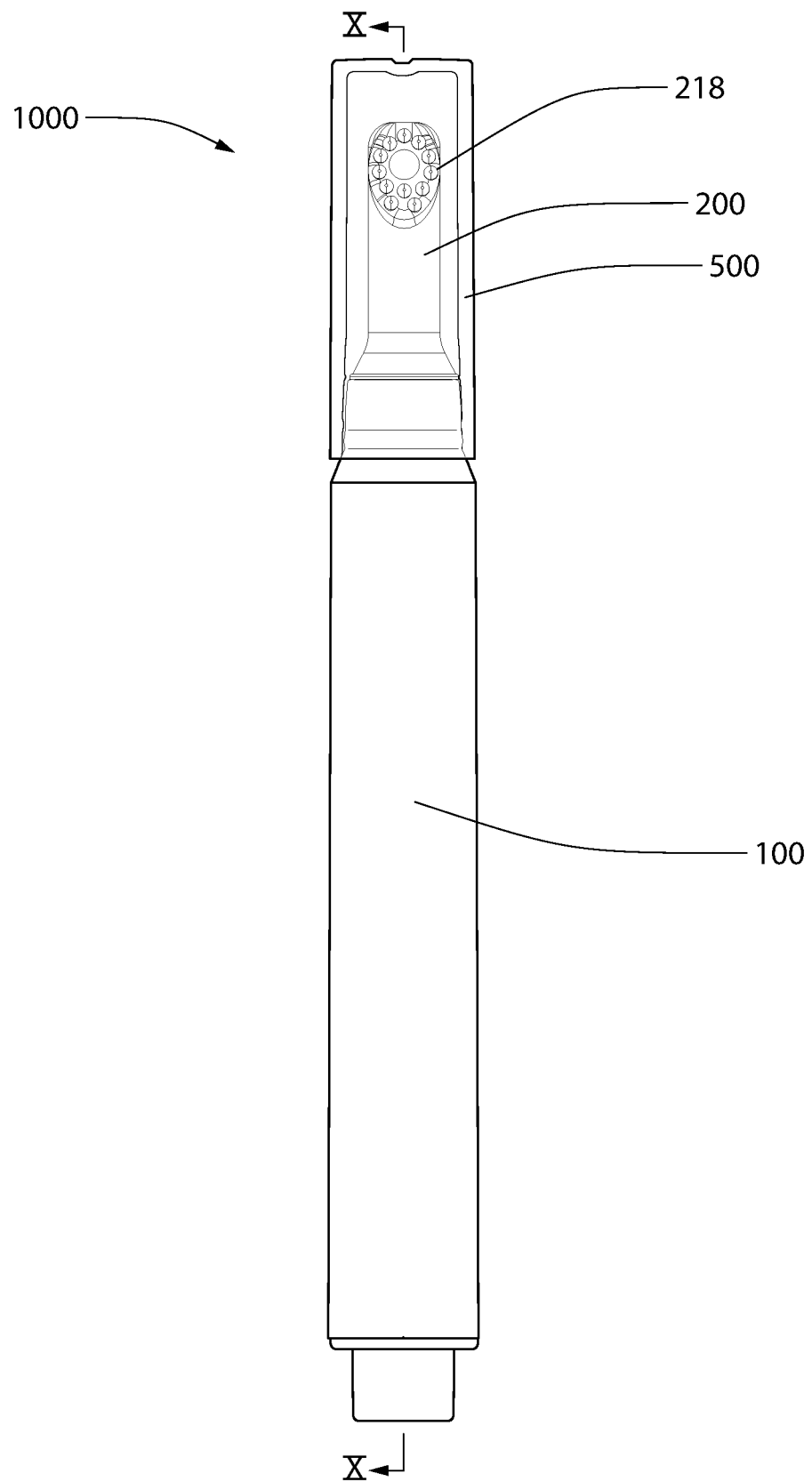
FIG. 9 is a front view of the tooth sensitivity treatment device of FIG. 1 with a cap covering the applicator.

Referring now to FIGS. 9 and 10, the oral cavity treatment device 1000 is illustrated in an assembled state. In FIGS. 9 and 10, the applicator 200 is coupled to the handle 100. Furthermore, in FIGS. 9 and 10 the cover or lid or cap member 500 is coupled to the handle 100 or to the applicator 200 so that the applicator 200 nests within an interior of the cover 500. Furthermore, in particular in FIG. 10, the engagement between the connection portion 203 of the applicator 200 and the neck 102 of the handle 100 can be seen. In particular, the protrusions 233 of the connector 203 nest within recesses in the inner surface of the neck 102. Furthermore, the cap 500 and the outer surface of the neck 102 have protrusions/recesses that mate with one another to facilitate the coupling of the cap 500 to the handle 100. It should be appreciated that as the user actuates the actuator 121, the oral cavity treatment composition 50 will be forced into the dispensing passageway 221 of the applicator 200 until the oral cavity treatment composition 50 exits through the dispensing aperture 223. As the oral cavity treatment composition 50 is dispensed, the user can directly engage the user's teeth/gums with the protuberances 218 of the application portion 205 of the applicator 200 to massage the oral cavity treatment composition 50 onto the teeth/gums as desired.

As noted above, the applicator 200 comprises a alignment feature 212, which may be in the form of a notch or recess located on a rear portion of the applicator 200. As seen in FIG. 10, the alignment feature 212 may not be physically engaged with the handle 100, but rather the alignment feature 212 may provide the user with a solely visual tool by which to properly angularly align the applicator 200 on the handle 100. In some embodiments, the handle 100 may comprise a alignment feature 112. The alignment feature 112 may be a texture on the outer surface of the handle 100 along a rear surface of the handle 100. Thus, the texture or other feature which forms the alignment feature 112 may be located only along the rear surface of the handle 100 and not also along the front surface of the handle 100. A user can visually align the alignment feature 212 of the applicator 200 with the alignment feature 112 of the handle 100 to maximize the user's grip during use of the oral cavity treatment device 1000.

Figure 11:
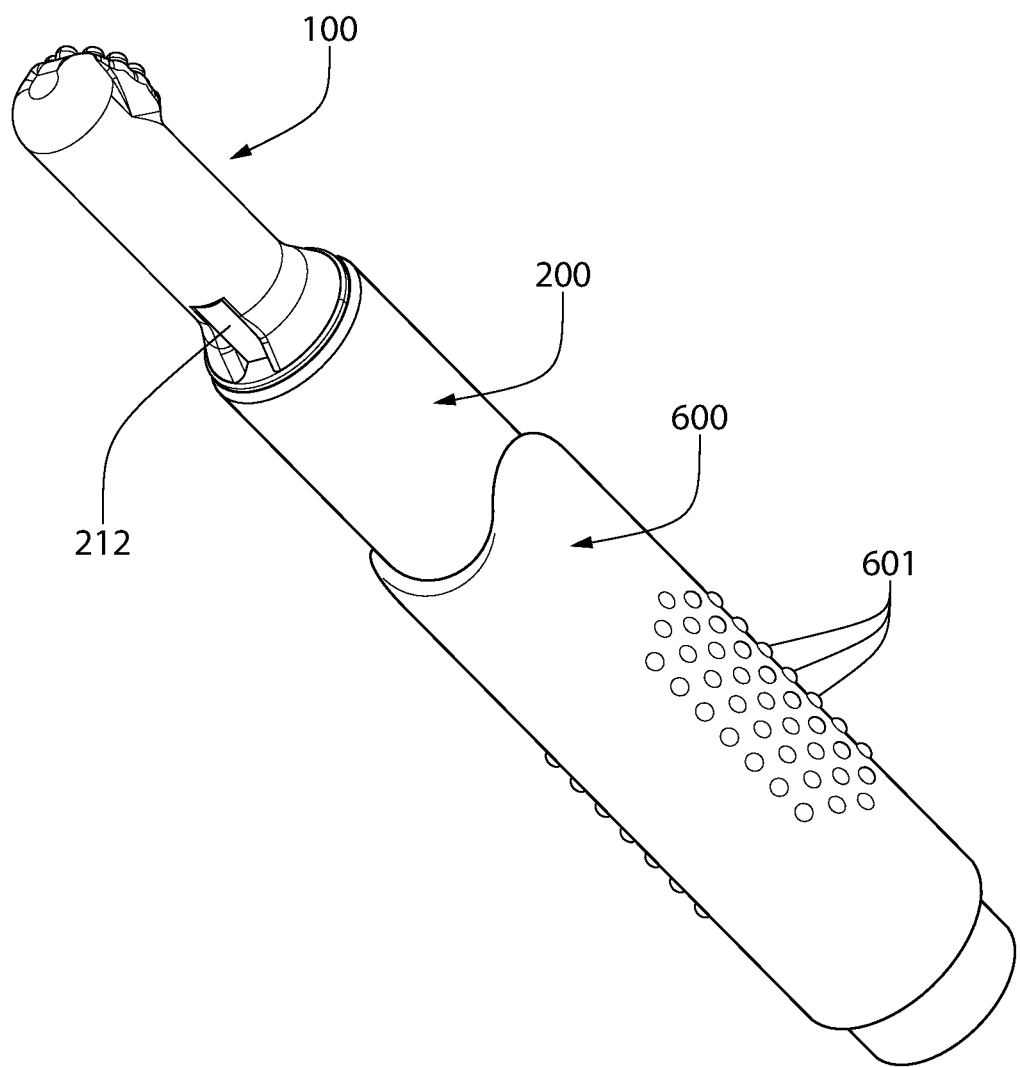
FIG. 11 is a perspective view of the tooth sensitivity treatment device of FIG. 1 with a sleeve coupled to the handle in accordance with an embodiment of the present invention.

Referring to FIG. 11, another use of the alignment feature 212 will be described. As shown in FIG. 11, the oral cavity treatment device 1000 comprises the handle 100 and the applicator 200, and further comprises a sleeve 600 which is coupled to and surrounds at least a lower portion of the handle 100. The sleeve 600 may be used in some embodiments, and may be omitted in other embodiments. The sleeve 600 may be formed from a resilient material such as a thermoplastic elastomer or the like. The sleeve 600 may comprise a grip enhancement feature, which in the exemplified embodiment is formed by a plurality of gripping protrusions 601. However, the grip enhancement feature may take on other forms, such as being indents rather than protrusion, or being a portion of the outer surface of the sleeve 600 that has a different coefficient of friction than the rest of the outer surface of the sleeve 600, or by being a roughened region on the outer surface of the sleeve 600, or the like. In some embodiments, it may be desirable for the grip enhancement feature (e.g., the gripping protrusions 601) to be located only along the lateral sides of the handle 100 and not also along the rear and/or front of the handle 100. The alignment feature 212 may assist in ensuring that the sleeve 600 is coupled to the handle 100 in a desired orientation so that the gripping protrusions 601 (or other grip enhancement feature or textured region, such as a roughened textured region or the like) are located in the desired angular position along the handle 100 to enhance the user's grip feel during use of the oral cavity treatment device 1000.

For example, the tools in the assembly line may recognize and/or register with the alignment feature 212 of the applicator 200 so that the sleeve 600 may be attached to the handle 100 in the desired angular orientation. That is, the tools in the assembly line may hold or position the oral cavity treatment device 1000 in specific orientation so that when the sleeve 600 is coupled to the handle 100 the gripping protrusions 601 (or other textured surface) is positioned at the desired location relative to the application portion 205 of the applicator 200. Thus, the alignment feature 212 of the applicator 200 may be a mechanical registration feature for the addition of a sleeve, label, or print during manufacture.

Moreover, the sleeve 600 may be a grip feature formed from a resilient material in some embodiments, but the invention is not to be so limited in all embodiments. In other embodiments, the sleeve 600 may be a label such as a sticker, an engraving, a printed patter, or the like located on the outer surface of the handle 100. Such labels have indicia or other information imprinted thereon, and it may be desirable to have such indicia located at a specific angular position along the outer surface of the handle 100. The first alignment feature 212 of the applicator 200 can facilitate this by ensuring that the tooling in the assembly line properly orients the oral cavity treatment device 1000 prior to affixing the label onto the handle 100 so that any such indicia is located at a desired angular position along the handle 100.

As used throughout, ranges are used as shorthand for describing each and every value that is within the range. Any value within the range can be selected as the terminus of the range. In addition, all references cited herein are hereby incorporated by reference in their entireties. In the event of a conflict in a definition in the present disclosure and that of a cited reference, the present disclosure controls.

While the invention has been described with respect to specific examples including presently preferred modes of carrying out the invention, those skilled in the art will appreciate that there are numerous variations and permutations of the above described systems and techniques. It is to be understood that other embodiments may be utilized and structural and functional modifications may be made without departing from the scope of the present invention. Thus, the spirit and scope of the invention should be construed broadly as set forth in the appended claims.

What is claimed is:

1. An oral cavity treatment device comprising:
a handle comprising a reservoir containing a tooth sensitivity composition;
an applicator configured to be coupled to the handle, the applicator comprising:
a bottom end, a top end, and a longitudinal axis extending between the bottom and top ends;
an inner surface that defines a dispensing passageway that is fluidly coupled to the reservoir of the handle when the applicator is coupled to the handle; and
an application portion for dispensing and massaging the tooth sensitivity composition onto a user's teeth, the application portion having an outer surface comprising a planar portion, the outer surface is oriented at an acute angle relative to the longitudinal axis and a dispensing aperture through which the tooth sensitivity composition is dispensed, and wherein the longitudinal axis does not intersect the outer surface of the application portion, and the planar portion of the outer surface circumscribes the dispensing aperture.

2. The oral cavity treatment device according to claim 1 wherein the dispensing passageway comprises a vertical portion that extends along a first axis that is coaxial with the longitudinal axis and a horizontal portion that extends along a second axis that is perpendicular to the first axis and oblique to the outer surface of the application portion, the horizontal portion extending from a distal end of the vertical portion to the dispensing aperture.

3. The oral cavity treatment device according to claim 1 further comprising a plurality of protuberances protruding from the planar portion of the outer surface of the application portion, the plurality of protuberances surrounding the dispensing aperture.

4. The oral cavity treatment device according to claim 1 wherein the applicator is divided into a front surface portion and a rear surface portion by a coronal plane, the application portion forming a part of the front surface portion, and further comprising a first alignment feature located along the rear surface portion.

5. The oral cavity treatment device according to claim 4 wherein the applicator comprises a proximal section that nests within the handle and a distal section that protrudes from a distal end of the handle, and wherein the first alignment feature of the applicator is a notch in the rear surface portion of the applicator located on a portion of the distal section that is adjacent to the distal end of the handle, wherein the handle comprises a front surface portion and a rear surface portion, the rear surface portion having a second alignment feature.

6. The oral cavity treatment device according to claim 1 wherein the applicator further comprises a tubular body portion having an outer surface, and wherein at least a lower portion of the outer surface of the application portion is elevated relative to the outer surface of the tubular body portion, the application portion comprising a lower edge portion that extends from the outer surface of the tubular body portion to the lower portion of the outer surface of the application portion, the lower edge portion facing downwardly towards the bottom end of the applicator.

7. The oral cavity treatment device according to claim 6 wherein the outer surface of the tubular body portion comprises a front surface portion that lies on a sagittal plane of the applicator and extends along an axis that intersects the outer surface of the application portion.

8. The oral cavity treatment device according to claim 1 wherein the planar portion of the outer surface of the application portion lies on a plane that is oriented at an angle of between 5° and 20° relative to the longitudinal axis of the applicator.

9. The oral cavity treatment device according to claim 1 wherein the applicator comprises:
a resilient component comprising an inner surface that defines an interior passageway, the resilient component comprising a head portion that forms the application portion of the applicator, a resilient body portion, and a resilient connection portion;
a rigid component comprising a rigid connection portion which surrounds the resilient connection portion of the resilient component and a rigid tubular portion which protrudes from a distal end of the rigid connection portion, the rigid tubular portion being located within the interior passageway of the resilient component along the resilient body portion of the resilient component; and wherein the resilient component and the rigid component are integrally bonded together.

10. The oral cavity treatment device according to claim 9 wherein the applicator has a length measured from the bottom end to the top end, and wherein the rigid component extends along no more than 80% of the length of the applicator, a distal-most portion of the applicator that extends along at least 20% of the length of the applicator being formed solely by the resilient component, wherein the distal-most portion of the applicator comprises a section of a vertical portion of the dispensing passageway and a horizontal portion of the dispensing passageway that extends from a distal end of the vertical portion of the dispensing passageway to the dispensing aperture.

11. The oral cavity treatment device according to claim 1 wherein the tooth sensitivity composition is an Arginine-CaCO3 formulation.

12. An oral cavity treatment device comprising:
a handle comprising a reservoir containing an oral cavity treatment composition;
an applicator configured to be coupled to the handle, the applicator comprising:
an inner surface defining a dispensing passageway that is fluidly coupled to the reservoir of the handle when the applicator is coupled to the handle, the dispensing passageway comprising a first portion extending along a first axis and a second portion extending along a second axis that is angled relative to the first axis;
a connector portion comprising an outer surface formed from a rigid material, the connector portion being configured to engage with the handle when the applicator is coupled to the handle;
a body portion comprising a shell formed from a resilient material and a core formed from the rigid material; and
a head portion comprising a distal section that is formed entirely from the resilient material, the head portion comprising a dispensing aperture that forms an outlet of the dispensing passageway, the distal section of the head portion comprising a distal portion of the first portion of the dispensing passageway and an entirety of the second portion of the dispensing passageway.

13. The oral cavity treatment device according to claim 12 wherein the applicator comprises a bottom end, a top end, and a length measured from the bottom end to the top end, and wherein the distal section of the head portion extends along between 20% and 30% of the length of the applicator.

14. The oral cavity treatment device according to claim 12 wherein the second portion of the interior passageway is perpendicular to the first portion of the interior passageway, and wherein no axis perpendicular to the first axis intersects the distal portion of the first portion of the dispensing passageway and the dispensing aperture.

15. The oral cavity treatment device according to claim 12 wherein the body portion comprises an inner surface formed from the rigid material and an outer surface formed from the resilient material, and wherein the connector portion comprises an outer surface formed entirely from the rigid material and an inner surface formed partially from the rigid material and partially from the resilient material, the rigid material extending through one or more openings in the resilient material along the connector portion.

16. The oral cavity treatment device according to claim 12 wherein the applicator comprises a resilient material component and a rigid material component, the rigid material component comprising a tubular portion that nests within the resilient material component along the body portion of the applicator, the tubular portion comprising a distal end that abuts against a downwardly facing shoulder of the resilient material component.

17. The oral cavity treatment device according to claim 12 wherein the first portion of the dispensing passageway of the resilient material component comprises a proximal portion and the distal portion, at least a portion of the distal portion having a reduced diameter relative to the proximal portion.

18. The oral cavity treatment device according to claim 12 wherein the applicator extends along a longitudinal axis that is coextensive with the first axis, wherein the head portion comprises an application portion comprising an outer surface that is oriented at an acute angle relative to the longitudinal axis, and wherein the longitudinal axis does not intersect the outer surface of the application portion.

19. The oral cavity treatment device according to claim 18 further comprising a plurality of protuberances protruding from the outer surface of the application portion, the plurality of protuberances arranged to surround the dispensing aperture, the plurality of protuberances having a diameter and a height, a ratio of the diameter of the protuberances to the height of the protuberances being in a range of 1.5:1 and 2:1.

20. The oral cavity treatment device according to claim 18 wherein the head portion comprises a front surface and a rear surface, the body portion being located axially between the head portion and the connector portion, and wherein the application portion is located along the front surface of the head portion, and wherein the body portion has a greater length than the head portion.

* * * * *